Nov. 18, 1947.　　　　L. F. O'BRIEN　　　　2,431,194
HAY SLING
Filed March 10, 1945　　　2 Sheets-Sheet 1
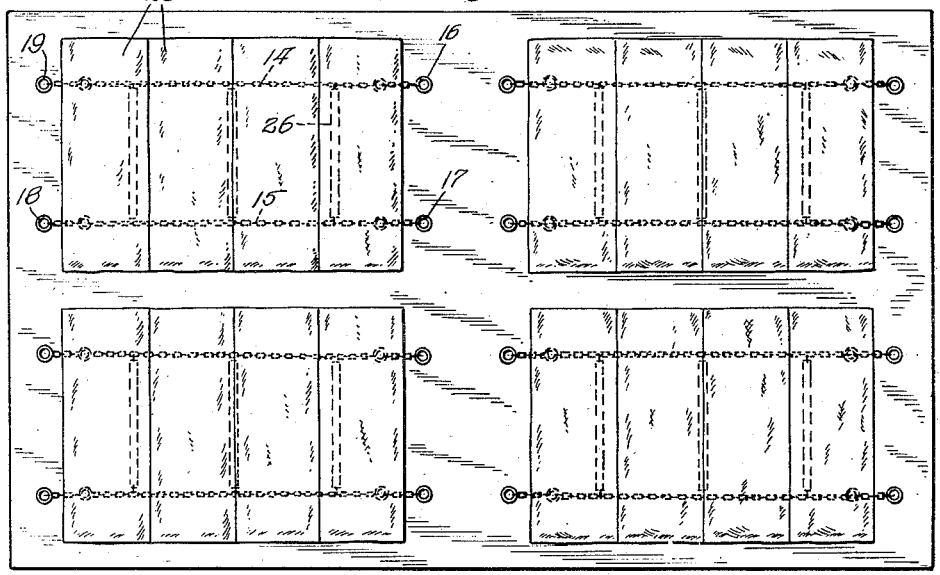
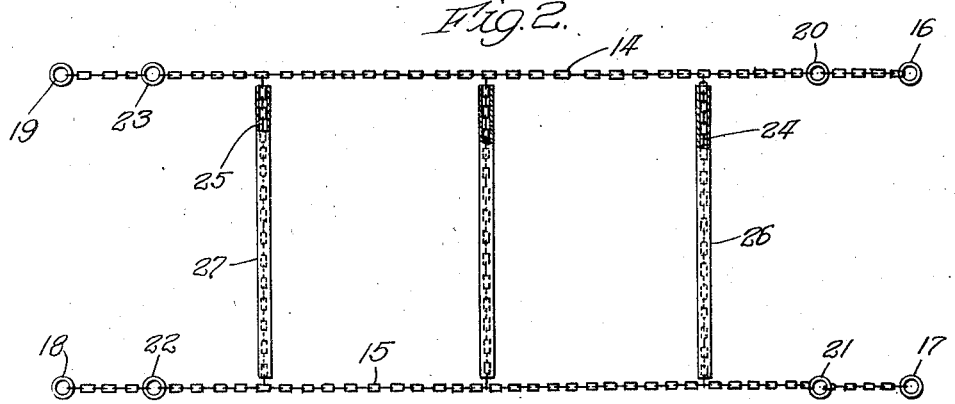
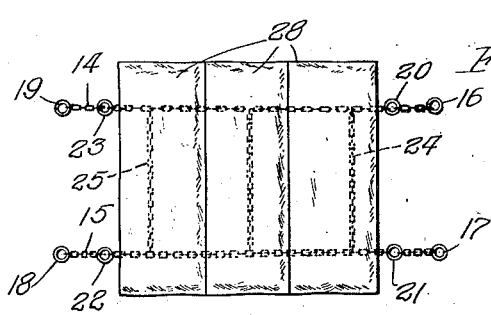
Inventor:
Lee F. O'Brien

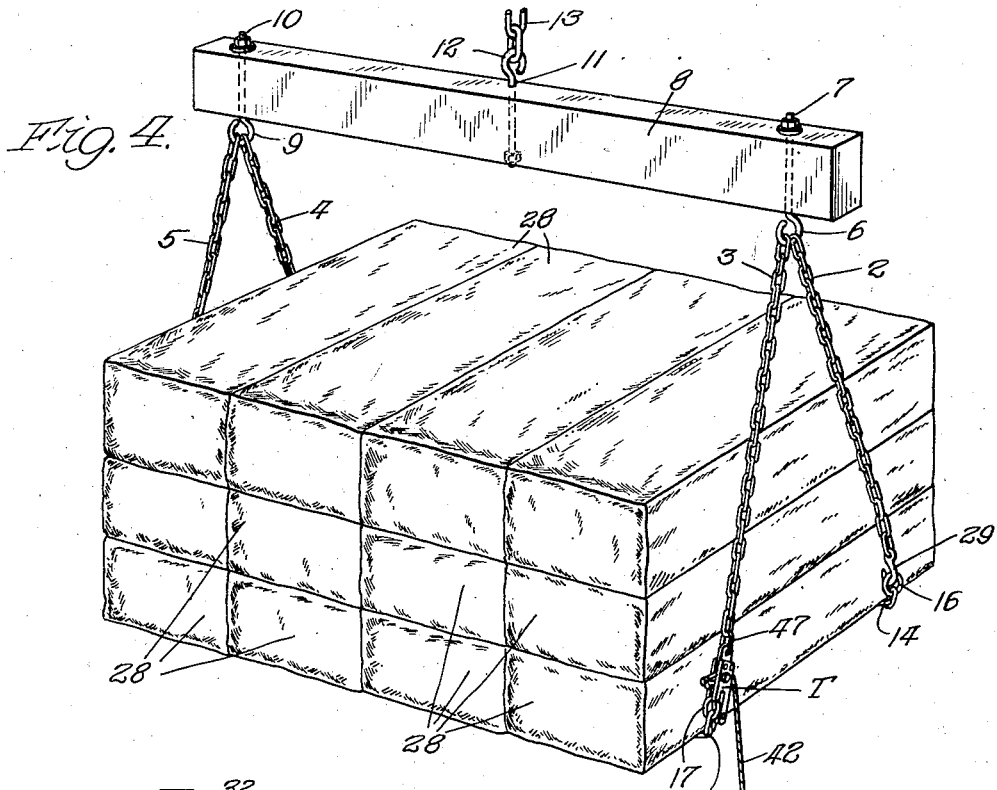

Patented Nov. 18, 1947

2,431,194

UNITED STATES PATENT OFFICE 2,431,194

HAY SLING

Lee F. O'Brien, Batavia, Ill.

Application March 10, 1945, Serial No. 582,103

9 Claims. (Cl. 294—74)

This invention relates to a hay sling and more particularly such a sling for hoisting, moving and releasing at a desired location a desired number of bales of baled hay in such manner that when the load is released the bales of hay will be fanned out and more widely distributed at the time of impact, so as to prevent the sudden deposit of a heavy load of bales over too small an area of floor surface which might cause the load of bales to crash through the floor. This is accomplished by releasing the loaded sling at one corner only which gives the bales a spreading action when being released.

In hay slings known prior to my invention, the slings have been so released as to suddenly trip the load of bales onto a localized spot, often resulting in damage to the hay loft floor or other place of deposit.

Among the objects of my invention are to overcome the disadvantages and accomplish the advantages referred to above; further to provide a hay sling quick and easy to operate, positive and efficient in action, economical to manufacture, durable in use, and convenient to load as well as more safe to handle; also to provide a hay sling such as to eliminate elevators and greatly lessen the number of men required for handling the baled hay; further to provide a hay sling that is more readily adapted to being loaded flat on a wagon surface, to receive the load with no loose ends to get caught in the wheels or other parts of the wagon, and in which the ends may be attached to upwardly extending flexible elements which are attached to the hoisting parts; further to provide a hay sling having a bottom portion only, one corner of which needs to be detached from the rest of the sling for discharge of the bales, the end chains, ropes or the like, and the bottom portion, remaining attached to the lifting beam; further to provide a hay sling in which it is easy to connect and disconnect the bottom portion, and to provide novel tripping means for tripping one corner of the sling when desired; and to provide a hook portion at each corner with means for releasing only one of said hooks. Further objects, advantages, and capabilities inherently possessed by my invention will later more fully appear.

My invention further resides in the combination, construction and arrangement of parts illustrated in the accompanying drawings, and while I have shown therein a preferred embodiment I wish it understood that the same is susceptible of modification and change without departing from the spirit of my invention.

In the drawings:

Fig. 1 is a top plan view of the surface of a hay wagon with four piles of baled hay thereon, each pile having a pair of my spaced-apart bottom members thereunder with the ends slightly protruding.

Fig. 2 is a top plan view of the bottom portion of my hay sling.

Fig. 3 is a top plan view of a group of bales of hay positioned on the bottom portion of my sling, and showing how the ends of the bottom members may project from the ends of the baled hay when three tiers are positioned thereon instead of four as in Fig. 1.

Fig. 4 is a perspective view of my improved hay sling in which 12 bales of hay are being raised.

Fig. 5 is an edge elevation of my new tripping mechanism.

Fig. 6 is a side elevation looking toward the right hand side of Fig. 5 but with the right hand side plate of the tripping mechanism omitted for the sake of clearness.

Fig. 7 is a side elevation of my tripping mechanism looking toward the right hand side of Fig. 5.

Referring more in detail to the drawings, my improved hay sling comprises a bottom support shown in Fig. 2 and upwardly inclined flexible end members 2, 3, 4 and 5 (see Fig. 4) the upper ends of members 2 and 3 being connected to the eyelet 6 of bolt 7 secured to hoisting beam 8, and the upper ends of flexible end members 4 and 5 being secured to eyelet 9 of bolt 10 of the hoisting beam. Midway of its length hoisting beam 8 is provided with bolt 11 having an eyelet 12 to which is secured a hoisting chain, rope or the like 13.

Referring to Fig. 2, the bottom support comprises the elongated bottom members 14 and 15 provided at their outer ends with rings 16, 17, 18 and 19. A slight distance inwardly from the end rings are also provided rings 20, 21, 22 and 23. Members 14 and 15 are preferably chains, but may be ropes, cables, or any other desirable elongated, flexible material. Extending between bottom members 14 and 15 at inwardly located positions are a pair of connecting chains 24 and 25 which may also be ropes, cables or other suitable connecting means.

As shown in Fig. 2, chains 24 and 25 are positioned within pipes 26 and 27, which pipes may also, if preferred, be leather tubing or any other suitable covering means. Also, if desired the pipes 24 and 25 or other suitable covering means, may be omitted and the chains or the like left uncovered.

Fig. 4 shows my improved sling lifting 12 bales of baled hay, these bales being indicated at 28. The bottom ends of the upwardly extending end members 2, 4 and 5 are preferably each provided with a hook 29 adapted to be hooked respectively into the rings 16, 18 and 19 of the bottom support, the hooks on the bottom ends of end members 4 and 5 being hidden behind the far end of the load in the sling. At the bottom end of the end member 3 is pivotally mounted a tripping mechanism indicated generally at T and comprising a pair of side plates 30 and 31 which at their upper ends are spaced apart by the neck member 32 secured by rivets or the like 33 between the upper ends of plates 30 and 31. The bottom ends of side plates 30 and 31 are spaced apart by the bottom end of lever 34 pivotally mounted by a rivet, bolt or the like 35 to the side plates. In order to give desirable clearness between the side faces of lever 34 and inner faces of side plates 30 and 31, these side plates at their bottom ends are formed with inwardly extending thin hubs 36.

Lever 34 at its mid position has an edgewise extending shoulder 37 adapted to be positioned or removed from below the bottom ends of slots 38 formed in the bottom portion of edgewise extending portions 39 of the side plates 30 and 31, but movable, between the side plates, to and from such position. The upper end of lever 34 is extended in an edgewise direction outwardly from the space between the side plates, to form the arm 40 in the end of which is formed an opening 41 through which is passed the end of a cable 42, which cable after being passed through said opening is formed with a knot 43 to prevent said end from slipping through the opening. Cable 42 passes through the space between the side plates and directly over the upper surface of the bolt 44 extending across the space between the side plates.

As seen in Fig. 4, this cable 42 may extend to any desired location of safety for manipulation by the operator. If desired, a spring 45 may be fixed at one end to the lever 34 and at the other end to one of the side plates to urge the lever 34 normally in a counterclockwise direction as viewed in Fig. 6, to position shoulder 37 to the left below slots 38 and between the side plates, it being understood that there is a slot 38 for each of the side plates. Neck member 32 is formed with a hole 46 through which is mounted one end of the bottom link 47 of the end chain 3 to permanently support this tripping mechanism on member 3.

When the desired number of bales of hay upon the bottom support 2 on the wagon bottom or other surface, with the ends of the bottom support extending outwardly a slight distance beyond the ends of the pile of baled hay, are to be raised or hoisted, the three hooks 29 on the bottoms of the end chains 2, 4 and 5 will be hooked into the rings 16, 18 and 19, the ring 17 will be moved upwardly into the two notches 38 of the tripping mechanism while the lever 34 is pulled back by rope 42, and the shoulder 37 of lever 34 then moved underneath the upper end of ring 17 by releasing said rope and normally held there by spring 45. This supports ring 17 in the tripping mechanism where it will be held during the lifting operation. When the piles of hay have been lifted to and above the desired point of deposit, the cable 42 may be pulled by the operator, which will move shoulder 37 to the right as viewed in Fig. 6, thus releasing ring 17 to the bottom support and causing the adjacent corner of the pile of bales of hay to trip and spread the bales of hay laterally and downwardly in a fanning action, thus spreading the bales of hay over the floor or other place of deposit and preventing the entire load from falling upon a small area which might break through said floor of the hay loft or other place of deposit.

The end members 2, 3, 4 and 5 may be as described in connection with the bottom support, chains, cables, rope or other suitable elongated, flexible material. As may be understood, the hoisting chain or cable 13 will preferably run up to a pulley in the peak of the barn in a conventional manner and the load then be moved longitudinally in the hay loft along the usual trackway. Rings 20—23, being positioned somewhat inwardly from the outer rings may be used when a less number of bales of hay are lifted, this arrangement providing for either a large number of bales or a smaller number. While I have above referred to elements 26 and 27 as pieces of pipes, leather tubing or the like, they may be made of wood or other suitable material, or, as earlier stated, entirely omitted, and the cross chains 24 and 25 be uncovered.

By placing the bottom supports in proper position on the bottom of a wagon the baled hay may be laid thereon on the wagon, and when the wagon is driven up to the barn all that is necessary is to hook the three hooks 29 into three of the end or intermediate rings, and the trip hook into ring 17 or 21 (depending upon how many bales are being handled) and when the load is lifted and carried to the desired place of deposit, pull the cable 42 and trip the load as explained above. When the load is tripped at one corner only, and the bales or other materials separated, fanned or uniformly distributed over the floor, the sling will then be lowered, the bottom support unhooked and the end members 2—5 hooked into the bottom sling member under the next pile of bales to be lifted, which next pile will already have the chains, ropes or the like of the bottom support, under the piled bales of hay.

I claim:

1. A sling for lifting shaped articles having length and substantial weight, comprising a pair of spaced apart elongated bottom members having ends adapted to project slightly beyond the articles to be lifted, an upwardly extending member at each end of each of said bottom members, rigid means extending across the articles to be lifted, the upper ends of the upwardly extending members being connected to said rigid means, the bottom ends of three of the upwardly extending members being connected to the respective ends of the bottom members manually nonreleasably during lifting, and the fourth upwardly extending member having manually releasable connecting means at one end thereof to release the sling and its load at one corner only.

2. A sling for lifting shaped articles having length and substantial weight, comprising a pair of spaced apart elongated bottom members having ends adapted to project slightly beyond the articles to be lifted, an upwardly extending member at each end of each of said bottom members, rigid means extending across the articles to be lifted, the upper ends of the upwardly extending members being connected to said rigid means, the bottom ends of three of the upwardly extending members being connected to the respective ends of the bottom members manually nonreleasably during lifting, and the fourth upwardly extending member having manually releasable connecting means at one end thereof to release the sling and its load at one corner only, and manually operated means for releasing said releasably connected means when desired while the load is in the sling.

3. A sling for lifting loads, comprising a pair of spaced apart elongated bottom members having ends adapted to project beyond the load, an upwardly extending member at each end of each of said bottom members, lifting means connected to the upper ends of the upwardly extending members, three of the projecting ends of the bottom members being connected to the lower ends of three of the upwardly extending members against manual release while the load is being lifted, and the fourth projecting end of the bottom members being connected to the lower end of the fourth upwardly extending member, said fourth upwardly extending member having manually releasable connecting means at one end thereof so that the load can be easily released when desired adjacent one corner only.

4. A sling for lifting loads, comprising a pair of spaced apart elongated bottom members having ends adapted to project beyond the load, an upwardly extending member at each end of each of said bottom members, lifting means connected to the upper ends of the upwardly extending members, three of the projecting ends of the bottom members being connected to the lower ends of three of the upwardly extending members against manual release while the load is being lifted, and the fourth projecting end of the bottom members being connected to the lower end of the fourth upwardly extending member, said fourth upwardly extending member having manually releasable connecting means at one end thereof so that the load can be easily released when desired adjacent one corner only, and transverse members connecting the bottom members underneath the load.

5. A sling for baled hay and the like, comprising a pair of spaced apart elongated bottom members adapted to have bales of hay placed thereon, upwardly extending members connected respectively to the ends of the bottom members, lifting means connected to the upper ends of the upwardly extending members, and tripping mechanism forming the connection between one of the upwardly extending members and one end of one of the bottom members, the remaining upwardly extending members being held against manual release from the respective ends of the bottom members during lifting of the load so that when desired the load may be released adjacent one corner only.

6. A sling for baled hay and the like, comprising a pair of spaced apart bottom members adapted to have bales of hay and the like stacked thereon, four upwardly extending members connected one to each end of each of the bottom members, a rigid lifting beam to which the upper ends of the upwardly extending members are attached, and a tripping mechanism in one of said upwardly extending members operable when desired to release the load adjacent one corner only, to spread the falling load and prevent it from causing impact in a restricted area, the remaining upwardly extending members being held against manual release from the respective ends of the bottom members during lifting of the load.

7. A sling for baled hay and the like, comprising a pair of spaced apart bottom members adapted to have bales of hay and the like stacked thereon, four upwardly extending members connected one to each end of each of the bottom members, a rigid lifting beam to which the upper ends of the upwardly extending members are attached, and a tripping mechanism in one of said upwardly extending members operable when desired to release the load adjacent one corner only, to spread the falling load and prevent it from causing impact in a restricted area, said tripping mechanism comprising a latch releasably connected to the adjacent end of the adjacent bottom member, the remaining upwardly extending members being held against manual release from the respective ends of the bottom members during lifting of the load.

8. A sling for baled hay and the like, comprising a pair of flexible spaced apart bottom members adapted to be laid flat on a wagon surface to have bales of hay and the like stacked thereon, each end of each of said bottom members having a ring adapted to extend beyond the adjacent end of the stacked bales, four upwardly extending flexible members three of which at their bottom ends are hooked into the respective adjacent rings of three of the bottom members ends and held against manual release therefrom during lifting of the load, the fourth upwardly extending member being connected to the fourth ring of the bottom members by a tripping mechanism having a latch for releasably holding said fourth ring, a rigid lifting beam to which the upper ends of the upwardly extending members are attached, and a pull cord for releasing the latch to release the load adjacent one corner only, to cause the load to fan out when falling.

9. A sling for baled hay and the like, comprising a pair of flexible spaced apart bottom members adapted to be laid flat on a wagon surface to have bales of hay and the like stacked thereon, each end of each of said bottom members having a ring adapted to extend beyond the adjacent end of the stacked bales, four upwardly extending flexible members three of which at their bottom ends are hooked into the respective adjacent rings of three of the bottom member ends and held against manual release therefrom during lifting of the load, the fourth upwardly extending member being connected to the fourth ring of the bottom members by a tripping mechanism having a latch for releasably holding said fourth ring, a rigid lifting beam to which the upper ends of the upwardly extending members are attached, and a pull cord for releasing the latch to release the load adjacent one corner only, to cause the load to fan out when falling, transverse members connecting the bottom members together, said bottom members and said upwardly extending members being formed of material such as chains, cables and the like.

LEE F. O'BRIEN.

REFERENCES CITED

The following references are of record in the file of this patent:

UNITED STATES PATENTS

| Number | Name | Date |
| --- | --- | --- |
| 643,558 | Tallet | Feb. 13, 1900 |
| 1,221,504 | Bouzo | Apr. 3, 1917 |
| 1,325,025 | Linnertz | Dec. 16, 1919 |
| 1,505,663 | Oliver et al. | Aug. 19, 1924 |
| 1,534,614 | Sims | Apr. 21, 1925 |
| 1,773,805 | Bouchard | Aug. 26, 1930 |

FOREIGN PATENTS

| Number | Country | Date |
| --- | --- | --- |
| 13,618 | Norway | May 13, 1903 |
| 68,112 | Switzerland | Feb. 23, 1914 |